United States Patent [19]
Hoff

[11] 4,088,210
[45] May 9, 1978

[54] CLUTCHES WITH BRAKE FOR IMPLEMENTS

[75] Inventor: Stephen J. Hoff, Richmond, Ind.

[73] Assignee: Hoffco, Inc., Richmond, Ind.

[21] Appl. No.: 659,350

[22] Filed: Feb. 19, 1976

[51] Int. Cl.² .................. F16D 67/02; F16D 21/08
[52] U.S. Cl. .................................... 192/17 D; 192/26;
    192/36; 192/48.92; 192/105 BA; 192/DIG. 2; 64/30 R
[58] Field of Search ............. 192/12 BA, 48.3, 48.92, 192/17 D, 103 B, 26, 36

[56] References Cited

U.S. PATENT DOCUMENTS

| | | | |
|---|---|---|---|
| 3,004,646 | 10/1961 | Seiden | 192/17 D |
| 3,319,751 | 5/1967 | Sacchini | 192/48.92 X |
| 3,361,165 | 1/1968 | Irgens | 192/26 X |
| 3,581,853 | 1/1971 | Hoff | 192/12 BA X |
| 3,785,465 | 1/1974 | Johansson | 192/105 BA |
| 3,958,680 | 5/1976 | Armbruster et al. | 192/105 BA X |

Primary Examiner—Benjamin W. Wyche

Attorney, Agent, or Firm—Jenkins, Coffey & Hyland

[57] ABSTRACT

A coil spring clutch connects a driving hub to a driven sleeve rotatable on the hub and the sleeve drives an output or second driven member through a torque limiting clutch. The spring is readily declutched by arresting rotation of its leading end, as by interposing a stop in the path of an out-turned tang on that end, and is re-engaged by releasing the leading end. Re-engagement is characteristically abrupt and harsh, and the torque-limiting clutch in series with the spring clutch limits torque stress on the spring so that the series assembly is usable in applications which would destroy the spring clutch alone. The torque-limiting clutch may be a fully-releasable centrifugal clutch, in which case, the spring declutching mechanism may be actuated in common with or in response to application of a brake to stop the second driven member, or may be a frictionally-engaged centrifugal clutch or a spring-biased friction clutch. The driven members are desirably mounted on the driving hub in a compact unitary assembly.

6 Claims, 11 Drawing Figures

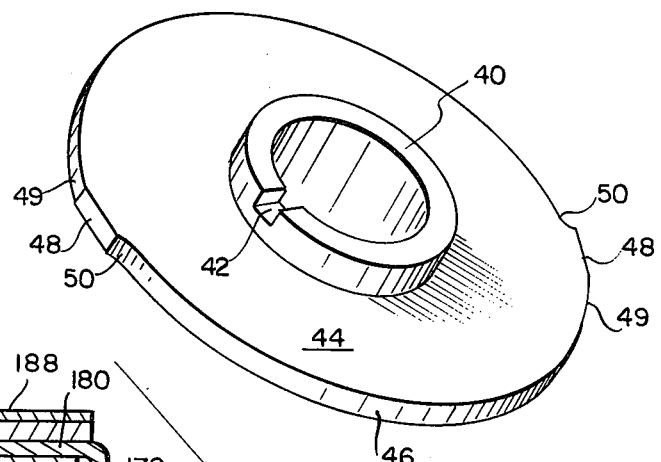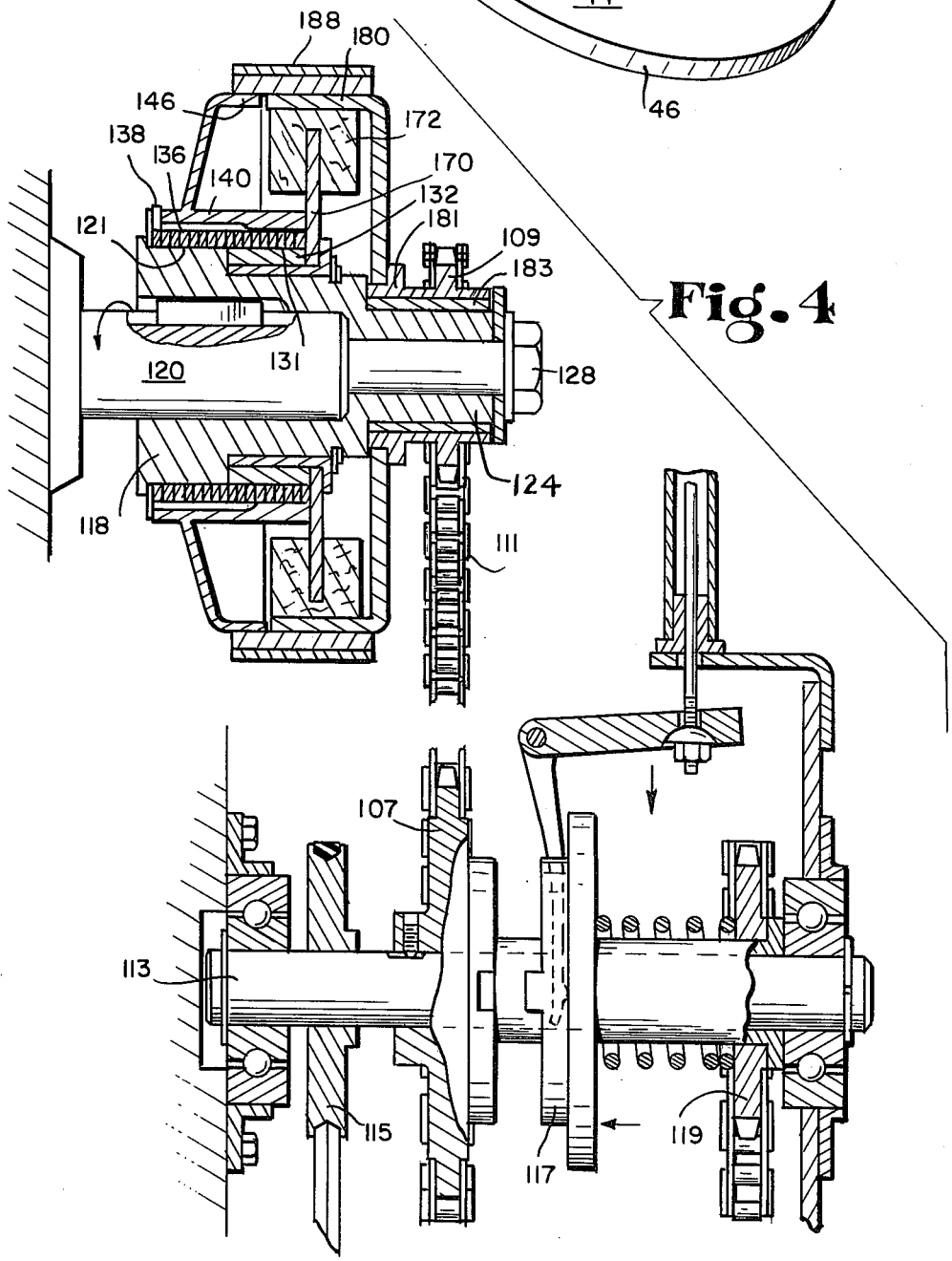

ns4,088,210

CLUTCHES WITH BRAKE FOR IMPLEMENTS

BACKGROUND OF THE INVENTION

This invention relates to a clutch combination especially adapted for use in the drive train of small horsepower power-driven implements, such as garden tractors, snowblowers, cultivators, mowers, and the like.

In such power-driven implements, it is in some cases necessary, and often desirable, to quickly disengage the drive train either to the propelling wheels of the implement or to the blade or other operating part of the implement. Coil spring clutches are advantageous for such disengagement, because they provide a quick declutching action with the use of a relatively simple and lightly loaded actuating device. Such clutches comprise, for example, a coil spring surrounding and frictionally engaged with aligned cylindrical clutch faces on coaxial driving and driven clutch members. The spring is wound of such a hand in relation to the forward driving direction of the clutch that the driving torque tends to wind the spring into tighter engagement with such clutch faces. The clutch is released by simply arresting the rotation of the leading end of the clutch spring, as by projecting a stop into the path of an outturned tang on such leading end.

While such clutches are advantageous for their simple and inexpensive construction and their effective and quick release, they also have the serious disadvantage that re-engagement of the clutch is abrupt and harsh and imposes shock loads on the spring, so that such clutches cannot be used where they must be engaged under load.

The present invention provides a combination clutch which is of simple, compact, and inexpensive construction and provides a unitary assembly which may be embodied as such in the drive train of various implements. The combination provides all the advantages of the coil clutch, particularly its quick release with a simple actuator. It avoids the disadvantages of the coil clutch and provides a soft engagement which limits the torque load imposed on the coil spring as engagement occurs and which permits a variety of engagement characteristics. The assembly may also provide the speed-responsive engagement features commonly required in the propulsion drive train of a self-propelled vehicle, such as a self-propelled snowblower, garden tractor and the like. It may also be combined with a brake which may serve as a brake for the vehicle or may provide a safety control which, for example, stops the blade of a lawn mower or snowblower in response to release of a dead-man control. The coil spring clutch release mechanism may be actuated in common with, or in response to, the actuation of the brake. For other applications, especially low-speed applications, the combination may include a friction clutch which serves primarily to limit the torque transmitted through the drive train, both to protect the coil spring clutch from excessive loads as the clutch is engaged, and to protect the drive train from damage in the event the driven element strikes some obstruction.

SUMMARY OF THE INVENTION

In accordance with the invention, the clutch comprises a driving element, preferably in the form of a hub adapted to be fixed on a drive shaft. A first driven element, preferably in the form of a sleeve, is rotatably mounted on the hub, and the sleeve and hub are formed with cylindrical clutch faces of equal diameter in substantially end-to-end relation, and a helical clutch spring is placed about such faces in overlapping relation with both. The spring is wound of such a hand that in forward drive it tends to wind in a direction to reduce its diameter and cause it to grip the two clutch faces of the hub and first driven member to clutch them together. This places the leading end of the spring on the hub and such leading end is provided with an outturned tang by which the leading end can be arrested from rotation to disengage the clutch from the rotating hub. A second driven member is mounted in coaxial relation with the hub and first driven sleeve, preferably on the hub, and a secondary clutch is interposed between the first driven member and the second driven member. Such secondary clutch has torque-limiting properties and may take any of a number of forms. In one form, as where it is desired to have the second driven or output member entirely declutched from the first driven member, the clutch between them may be a centrifugal clutch which is normally biased to disengaged position and engages in response to centrifugal force.

With a combination including such a normally disengaged centrifugal clutch, the centrifugal clutch drum may also serve as a brake drum engaged by an external brake band, and the brake band may be arranged to engage not only the brake drum but also a control element which controls rotation of the tang at the leading end of the coil clutch spring, so that when the brake is applied such coil spring is disengaged and the second driven or output member is simultaneously braked.

As a modification of the centrifugal clutch combination, the centrifugal clutch may be one in which the centrifugal weights are biased to engaged position, and this provides a very low level of torque when the coil spring clutch is initially engaged but rapidly increases the torque capacity of the drive train as the speed builds up.

A clutch combination embodying a second form of secondary clutch between the first and second driven members of the combination is one in which the output or second driven member is rotatably mounted on the first driven member or sleeve and is frictionally clutched thereto as by friction plates pressed against the side faces of the output member. This limits the shock loads which can be imposed on the coil spring during its engagement and also on other parts of the drive train during operation. This form of clutch combination may also be combined with a brake, as to hold a driven member such as a snowblower auger from rotation during self-propelled transport of the implement.

BRIEF DESCRIPTION OF THE DRAWINGS

The accompanying drawings illustrate the invention and show a number of preferred embodiments for different applications. In such drawings:

FIG. 3 is a perspective view of the release or dump collar which controls engagement of the spring clutch;

FIG. 4 is a longitudinal section of a clutch combination similar to that of FIG. 1 applied to drive a sprocket which may be connected as shown diagrammatically to drive a countershaft which is connected directly to a wheel driving pulley and through a dog-clutch to drive a snowblower drive sprocket;

DETAILED DESCRIPTION OF THE PREFERRED EMBODIMENTS

Figure 1:
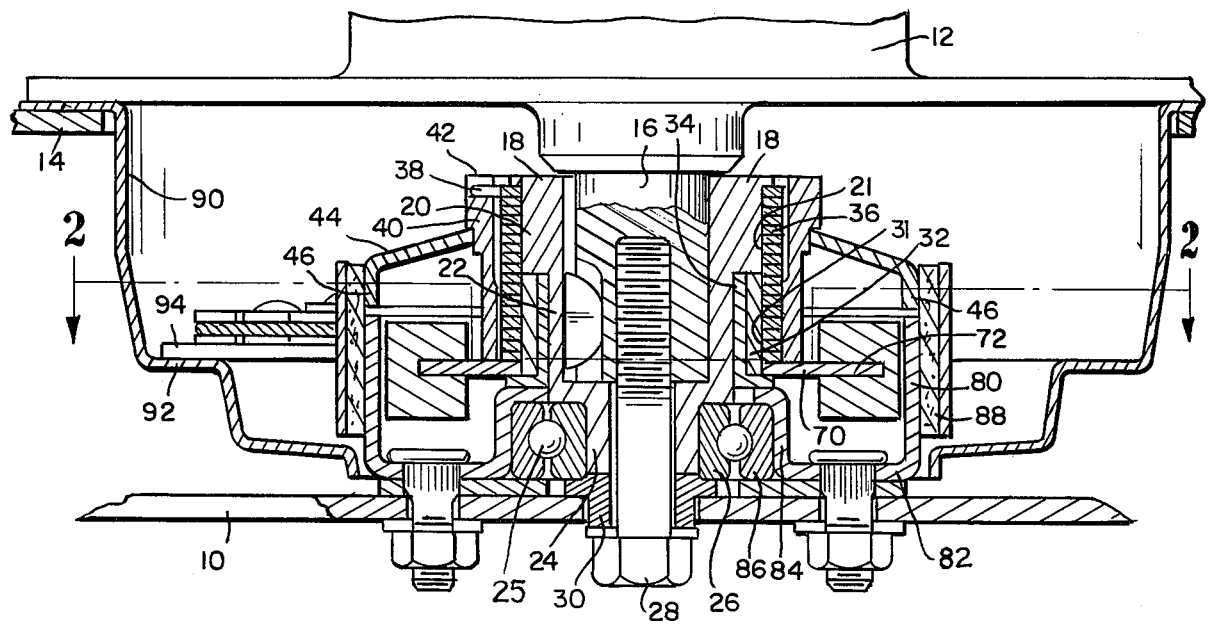
FIG. 1 is a vertical section of a clutch combination in accordance with the invention, mounted on the vertical drive shaft of an engine and applied to drive a lawn mower blade in a manner analogous to that of my copending application Ser. No. 581,029 filed May 27, 1975.
Figure 2:
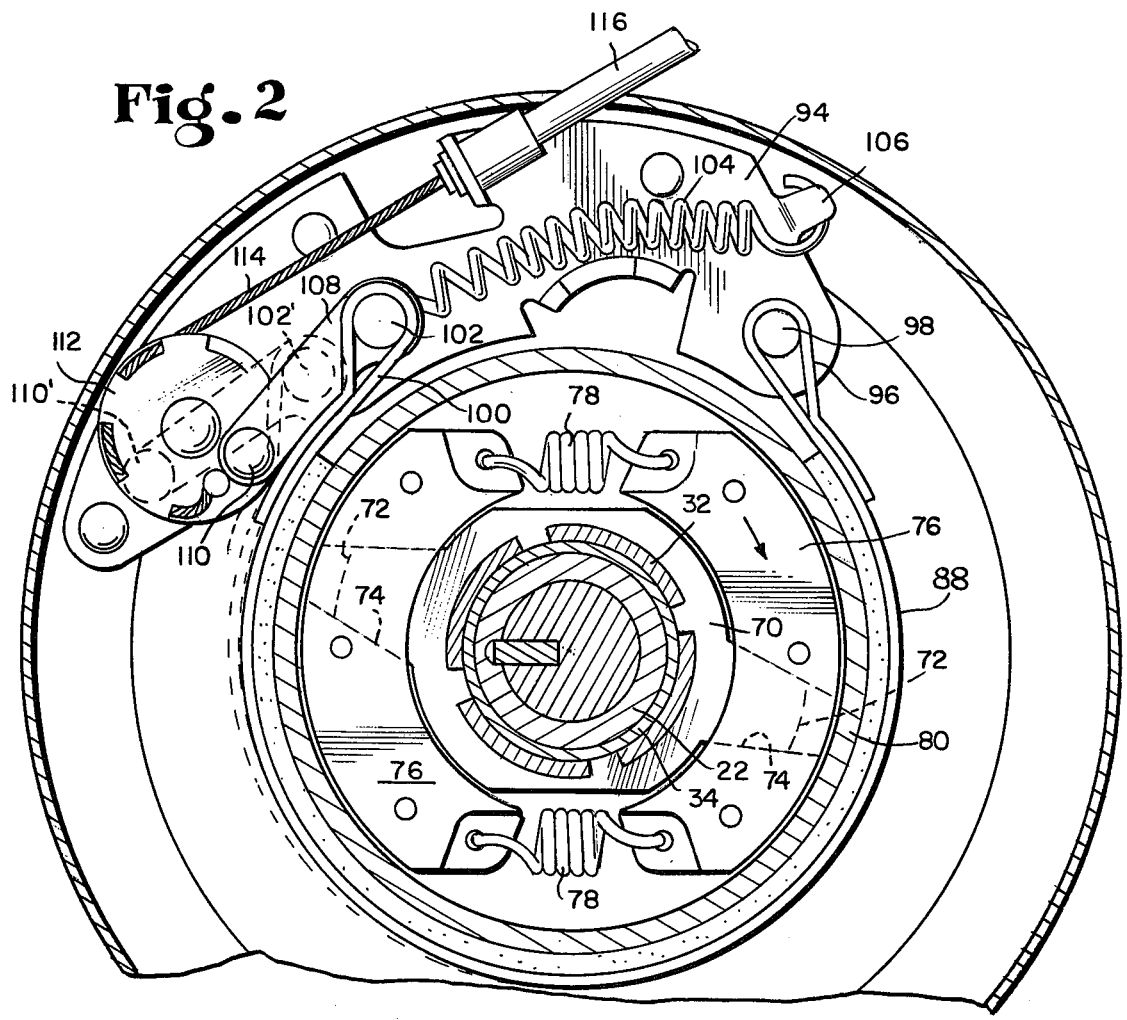
FIG. 2 is a horizontal section taken on the line 2—2 of FIG. 1.

The embodiment shown in FIGS. 1-3 is applied to drive the cutting blade 10 of a rotary lawn mower. An engine 12 is mounted on the deck 14 of a lawn mower of the type shown in my co-pending application Ser. No. 581,029, with its drive shaft 16 depending below the level of that deck. A hub 18 is mounted on the shaft 16 and has an upper cylindrical portion 20, an intermediate portion 22 of reduced diameter, and an end portion 24 of further reduced diameter which supports the inner race 26 of a ball bearing. A bolt 28 threaded into the shaft 16 secures a pilot washer 30 against the end of the inner race 26 and thereby secures the hub 18 on the shaft 16.

In the clutch assembly, the hub 18 is the driving member. A first driven member or sleeve 32 is rotatably mounted on the intermediate portion 22 of the hub 18 by a sleeve bearing 34, and lies in abutting relation with the upper cylindrical portion 20 of the hub. That cylindrical portion 20 and the sleeve 32 have adjoining cylindrical surfaces of the same diameter, which form cylindrical clutch faces 21 and 31. A helical clutch spring 36 is disposed about such faces and extends across both faces 21 and 31. The spring is wound of a hand such that in forward drive between the hub 18 and the first driven member or sleeve 32, the spring tends to wind in a direction which reduces its diameter and increases its engagement with the clutch faces 21 and 31. When the forward drive direction is clockwise as viewed from above, as shown by the arrow in FIG. 2, the clutch spring is wound as a left-hand helix. Its leading end is disposed at the top of the clutch face 21 on the hub 18, and is provided with an out-turned tang 38. The spring is surrounded by an elongated release collar 40 which closely surrounds the lower half of the spring so as to be loosely held concentric therewith, and has substantial clearance with the upper half of the spring to allow that spring to expand. The collar 40 has a radial notch 42 at its upper end which receives the out-turned tang 38 at the leading end of the spring. The collar 40 carries an outward and downward sloping flange 44 which has a generally cylindrical rim 46 at its outer edge. For purposes to be described below and as shown in FIG. 3, the rim 46 has two diametrically opposite lands 48 of slightly greater diameter than the rest of the rim 46, and such lands are blended into the circumference by a gently sloping ramp 49 at their leading ends, and are connected to the main portion of the rim 46 by an offset 50 at their trailing ends. Stopping the rotaton of the flange 44 and release collar 40 will arrest the rotation of the tang 38 at the leading end of the clutch spring 36, and any force or drag tending to rotate the spring will cause the spring to unwind and release from the clutch face 21 of the driving hub 18.

The first driven member or sleeve 32 carries at its lower end a shoe-carrier plate 70 having two driving lugs 72, and these are engaged in radial sockets 74 of a pair of centrifugal clutch shoes 76. The clutch shoes are interconnected by tension springs 78 which normally hold them in retracted position. The shoes are surrounded by a drum 80 formed as a rim on a radial web 82 carried by an in-turned flange 84 which engages the outer race 86 of the ball bearing 25. The drum 80 serves as the clutch drum with which the centrifugal shoes 76 engage during operation of the clutch.

The drum 80 also serves as a brake drum which is engaged on the outside by a brake band 88. As shown in FIG. 1, the rim 46 of the spring clutch release collar assembly is axially aligned with the drum 80, and the brake band 88 extends upward beyond the end of the drum 80 into overlying relation with that rim 46, so that when the brake 88 is engaged, it not only brakes the drum 80 but also engages the rim 46 to stop the rotation of the release collar and thus arrest rotation of the tang 38 at the leading end of the clutch spring 36 so as to cause that spring to disengage. The lands 48 on the outer face of the rim 46 permit the brake band to first stop the release collar and then further contract to brake the drum 80.

The brake actuating mechanism shown in FIG. 2 is like that shown in my co-pending application Ser. No. 581,029. The entire assembly is enclosed in a bowl 90 which is formed with a platform 92 on which the brake mechanism is mounted. Such brake mechanism comprises a mounting plate 94 fixed on the platform. The counterclockwise end 96 of the brake band 88 is bifurcated and received over the clockwise end of the mounting plate 94 and is anchored thereto by an anchor pin 98. The opposite end 100 of the brake band 88 is bifurcated and formed as a loop. The loop is received over a draw pin 102 which is engaged by a spring 104 which is anchored to a tab 106 on the mounting plate and pulls the brake band toward engaged position. A link 108 extends between the draw pin 102 and an eccentric pin 110 on a crank wheel 112. An actuating cable 114 is engaged in a groove in the crank wheel 112, and extends through a sheath 116 to an actuating lever on the mower. When the cable 114 is pulled to release position, this rotates the crank wheel 112 to carry the pin 110 to the dotted line position 110' shown in FIG. 2, and this pulls the draw pin 102 to the dotted line position 102' and expands the brake band out of engagement with the brake drum 80 and out of engagement with the rim 46 of the release collar assembly.

Operation of this embodiment is as follows. With the parts as shown in FIG. 1, the release collar 40 is held stationary by the brake band 88 and prevents rotation of the tang 38 at the leading end of the clutch spring 36. The engine 12 can be started and will rotate the hub 18 which has its clutch face 21 in light frictional engagement with the inner surface of the upper half of the clutch spring 36. Such rotation will tend to cause the spring to unwind relative to its arrested leading end, and this will tend to expand the spring out of engagement with the clutch face 21 of the hub 18 and will allow that hub to rotate freely with but light frictional drag from the spring. If the brake is now released by manual pull on the cable 114, this will release the release collar assembly 40–46 and allow the tang 38 and the leading end of the spring to rotate with the hub. The clutch spring 38 will then engage the clutch the first driven member or sleeve 32 to the hub 18. Since the centrifugal clutch shoes 76 are in retracted position, the only load on the spring clutch during this engagement is the relatively minor load of the inertia of the sleeve 32, its shoe carrier 70 and the shoes 76, and the spring clutch will thus engage under stubstantially no load conditions.

As the first driven member of sleeve 32 is rotated, and as the speed of the engine is increased, the clutch shoes 76 will move outward under centrifugal force to engage the drum 80 and transmit drive to the second driven member formed by that drum and the parts connected to it, and thus transmit drive to the mower blade 10.

The brake mechanism may be controlled by a deadman lever, as shown in my co-pending application Ser. No. 581,029, which lever will be held in brake-releasing position when the mower is in operation and will be released to allow the brake to be engaged by the spring 104 when the dead-man lever is released. In such deadman control, the present combination clutch provides an especially advantageous operation. When the deadman lever is released, the spring 104 immediately pulls the brake band 88 into engagement with the drum 80 and with the rim 46. Because of the raised lands 48 on that rim 46, the band will initially engage those lands and arrest the rotation of the release collar assembly which in turn will arrest the rotation of the tang 38 at the leading end of the clutch spring 36, and this will immediately cause that spring to disengage from the hub 18 and thus declutch the driven members from driving relation with the engine. Concurrently, the brake band 88 will engage the brake drum 80 and will rapidly decelerate the rotation of the lower blade 10. The centrifugal clutch will also decelerate, and the clutch shoes 76 will be retracted out of engagement with the drum 80. This action will stop the mower blade 10 within a matter of a few seconds, and will leave the engine running under no load except the light frictional drag of the upper half of the clutch spring 36 on the clutch face 21 of hub 18.

In this modification, the control of the spring clutch is in common with the control of the brake band 88, and the manual operation of the control cable 114 directly actuates the brake band 88 and this in turn controls the release collar assembly 40–46, so that the clutching and declutching of the spring clutch occur in response to the manual release and engagement of the brake band 88.

Figure 5:
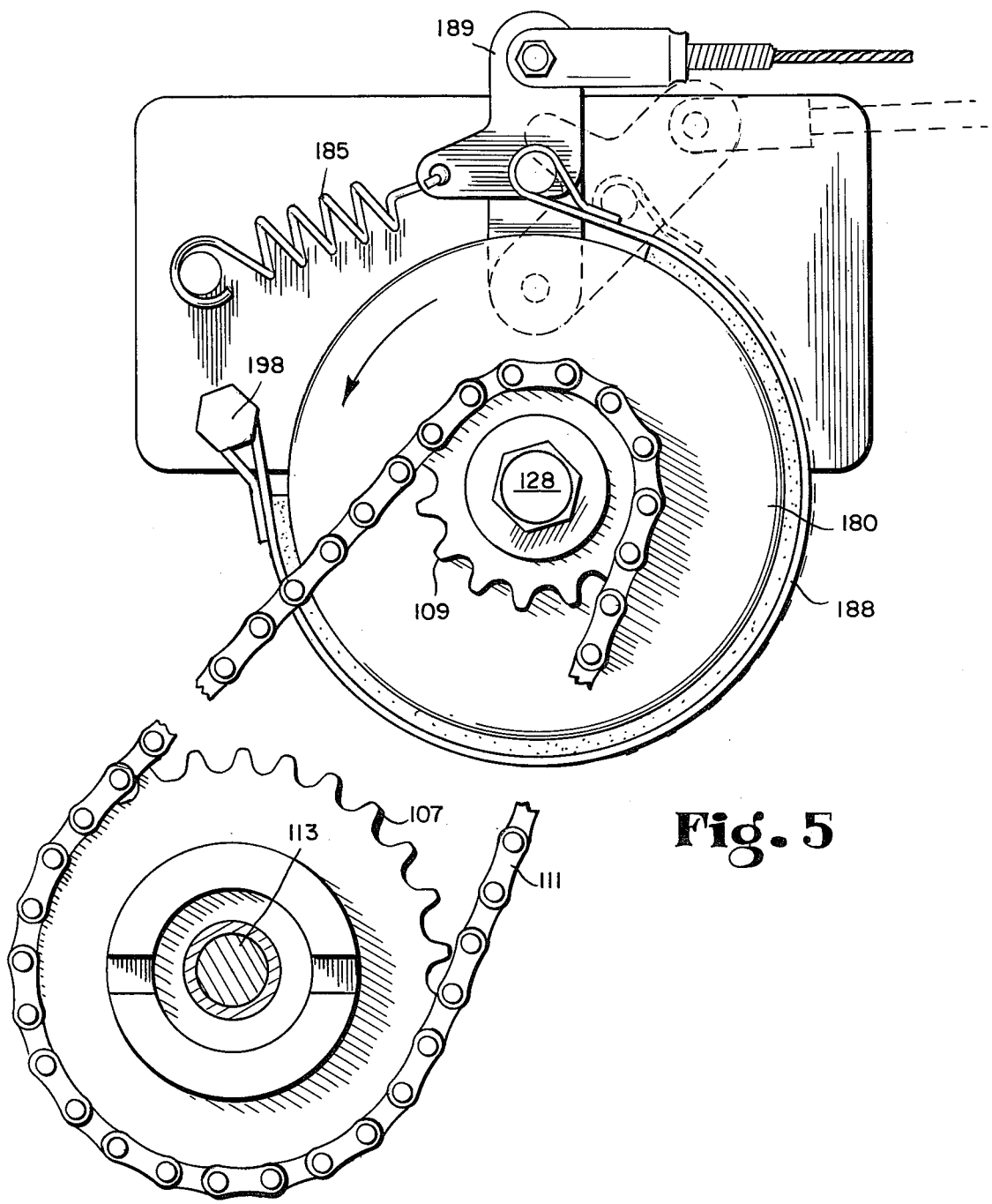
FIG. 5 is an elevation showing a control linkage for the clutch combination of FIG. 4.

The modification shown in FIGS. 4 and 5 is similar to that described above, but is applied to drive a sprocket 109 which is connected by a chain 111 to a sprocket 107 on a countershaft 113 which carries a pulley 115 for connection to drive the wheels of the snowblower, and carries a dog clutch 117 which is engageable to drive a sprocket 119 for driving the blower blade or auger of the snowblower.

The clutch combination comprises a hub 118 mounted on the shaft 120 of an engine and held thereon by a bolt 128. The hub has a spring clutch face 121 and carries a first driven member or sleeve 132 which has a clutch face 131 aligned with the face 121. The two clutch faces 121 and 131 are engaged by a coil spring 136 which has an out-turned tang 138 as its leading end in engagement with a collar 140 connected to and controlled by a rim 146. The collar may be as shown in FIG. 3. The sleeve 132 carries a shoe-carrier plate 170 on which clutch shoes 172 are mounted in position for centrifugal engagement with a drum 180. The drum 180 forms a second driven member and is carried by a sleeve 181 on which the sprocket 109 is mounted. The sleeve 181 is rotatably mounted by a sleeve bearing 183 on the reduced end 124 of the hub 118.

As shown in FIG. 5, brake band 188 surrounds the drum 180 and is anchored at one end of an anchor pin 198 and is connected at the other end to a pivoted control lever 189 which is pulled toward brake-engaged position by a spring 185. The free end of the control lever 189 is connected to an actuating cable leading to a dead-man handle lever (not shown).

Operation of this embodiment is similar to that of FIGS. 1–3. The brake band 188 is normally held engaged by the spring 185, and the brake band holds the drum 180 and the connected sprocket 109 stopped. It also engages the release collar assembly 140–146 so as to arrest the rotation of the tang 138 at the leading end of the clutch spring, and thus to cause that spring to disengage from the clutch face 121 on the hub 118. The engine can be started and rotated freely under these conditions, with only a light drag from the clutch spring 136. When the brake band 188 is released by actuating the lever 189, this allows the clutch release collar 146 to rotate and allows the leading end of the spring to engage the clutch face 121 on the hub 118, and to clutch that hub to the first driven element or sleeve 132, and this drives the clutch shoes 172. The retracting springs for such shoes 172 can be calibrated to allow the engine to idle without engagement of the centrifugal clutch, and thus to give a desirable and commonly used speedresponsive control of the drive to the counter shaft 113 and wheels. For transport of the snowblower vehicle without operating the blower, the dog clutch 117 is disengaged, and the engine is then accelerated to cause the centrifugal clutch shoes 172 to engage and drive the sprocket 109 and thus to drive through the chain 111 and wheel pulley 115 to propel the wheels of the implement. When blower operation is desired, the engine is decelerated to disengage the centrifugal shoes 172 and interrupt the drive, the dog clutch 117 is then engaged, and the engine is then accelerated to re-engage the centrifugal clutch shoes 172 and thus to drive both the wheel pulley 115 and the blower driving sprocket 119. The control lever 189 is connected to a dead-man lever, so that the brake band 188 will be disengaged when the dead-man lever is held in actuated position and engaged when the dead-man lever is released. The brake band, when released, will first engage the rim 146 of the clutch release collar so as to arrest rotation of the tang 138 at the leading end of the clutch spring 136, and this will immediately disengage the drive between the engine-driven hub 118 and the first driven member or sleeve 132. The brake band will also engage the drum 180 to stop both the wheel drive and the blower drive.

Figure 7:
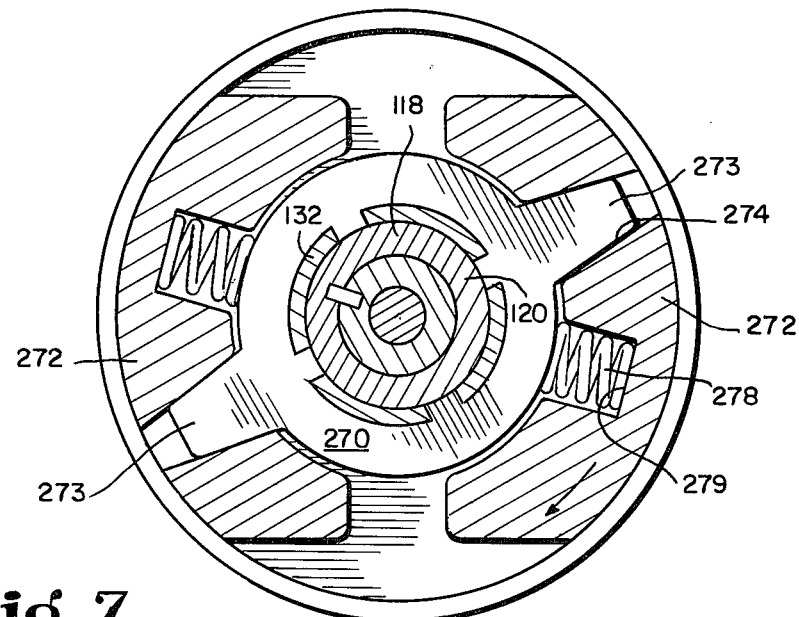
FIG. 7 is a transverse section of the clutch combination shown in FIG. 6.
Figure 6:
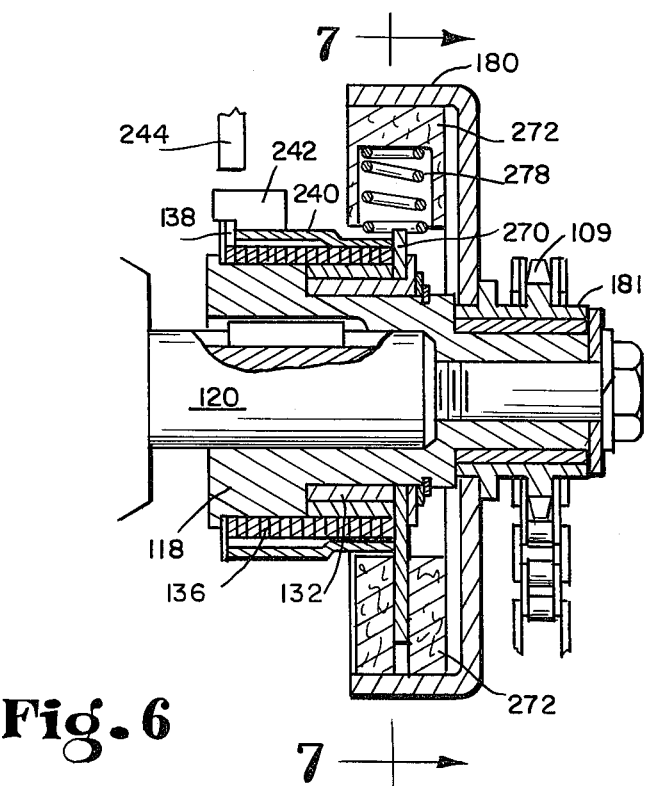
FIG. 6 is a longitudinal section of a clutch combination similar to that of FIG. 4 but in which the shoes are biased to engaged position instead of to retracted position.

The modification of FIGS. 6 and 7 is similar to that of FIGS. 4 and 5 but omits the brake. It has a hub 118 mounted on an engine shaft 120, with a first driven element or sleeve 132 mounted on the hub and clutched thereto by a clutch spring 136 in the same manner as in FIGS. 4 and 5. The outer end of the hub 118 has a sprocket 109 rotatably mounted thereon and supported by a sleeve 181 which also supports a drum 180. The first driven member or sleeve 132 carries a shoe-carrier plate 270 on which centrifugal clutch shoes 272 are mounted. As shown in FIG. 7, the clutch shoes 272 are not biased to retracted position, and instead are urged outward toward engaged position by compression springs 278 mounted in pockets 279 formed in the shoes 270. Desirably, the springs 278 are located toward the forward ends of the shoes, and the shoes are engaged with the lugs 273 in sockets 274 adjacent the rear ends of the shoes. This location of the drive lugs 273 gives self-energizing properties to the shoes. In this modification, the clutch spring release collar 240 is provided with a wing 242 which is positioned to be stopped from rotation by interposing in its path a manually controlled stop member 244.

Operation of this modification of FIGS. 6 and 7 is as follows. With the manual stop member 244 retracted as shown in FIG. 6, the clutch release collar 240 is free to rotate, and the tang 138 at the leading end of the clutch spring 136 rotates with the hub 118 and the spring clutches the first driven member of sleeve 132 to the hub. This drives the shoe-carrier 270 and the centrifugal clutch shoes 272, and such shoes frictionally drive the drum 180 to transmit drive to the sprocket 109. When the stop member 244 is projected into the path of the wing 242, this arrests the rotation of the release collar 240 and the clutch spring 136, and this declutches that spring from the hub 118, which interrupts drive through the clutch combination, so that the implement driven by the sprocket will stop. If the stop member 244 is then manually retracted, this will release the release collar 240 and the tang 138 for rotation with the hub 118, and this will cause the spring clutch to engage. While such engagement is abrupt, the load imposed on the spring during such engagement will be limited and will consist only of the inertia of the sleeve 132, the plate 270 and the clutch shoes 272, and the limited frictional drag between the shoes 272 and the drum 180 under the relatively light engagement imposed by the biasing springs 278. Engagement will thus not impose excessive shock loads on the clutch spring 136. As the speed of rotation increases, the clutch shoes 272 will be urged centrifugally against the drum 180 to increase the driving force transmitted between them so that the clutch combination will progressively transmit increasingly greater torque. At full engine speed, the clutch combination will transmit high torque with little or no slip.

Figure 8:
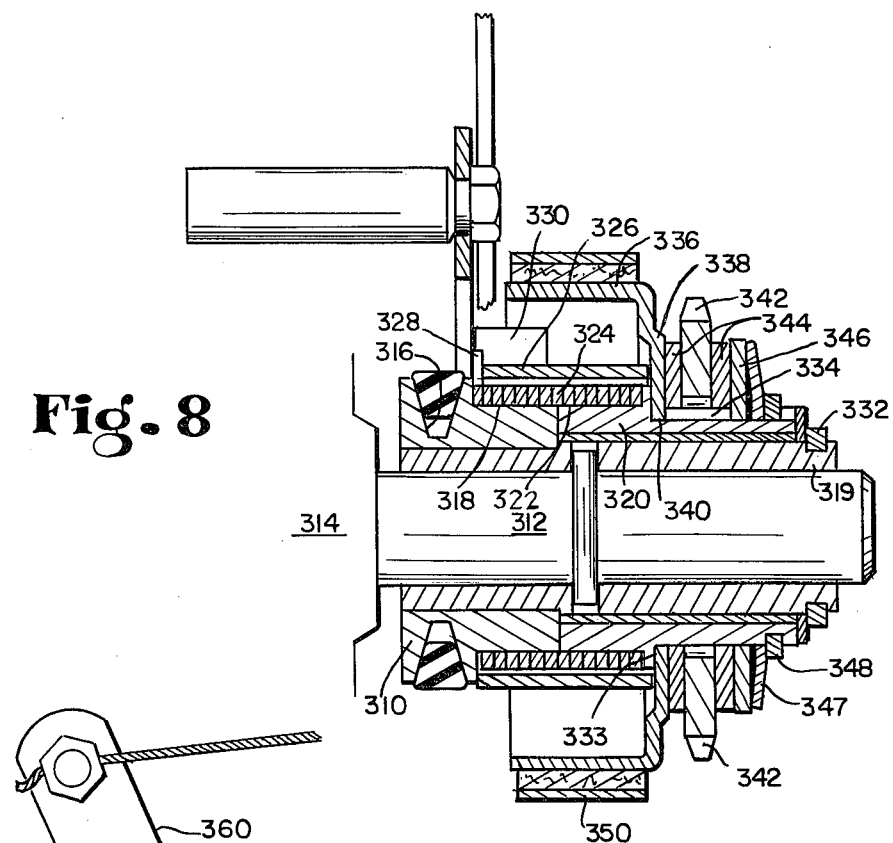
FIG. 8 is an axial section of a clutch combination including a friction clutch between the first and second driven members and including also a pulley groove in the driving hub.
Figure 9:
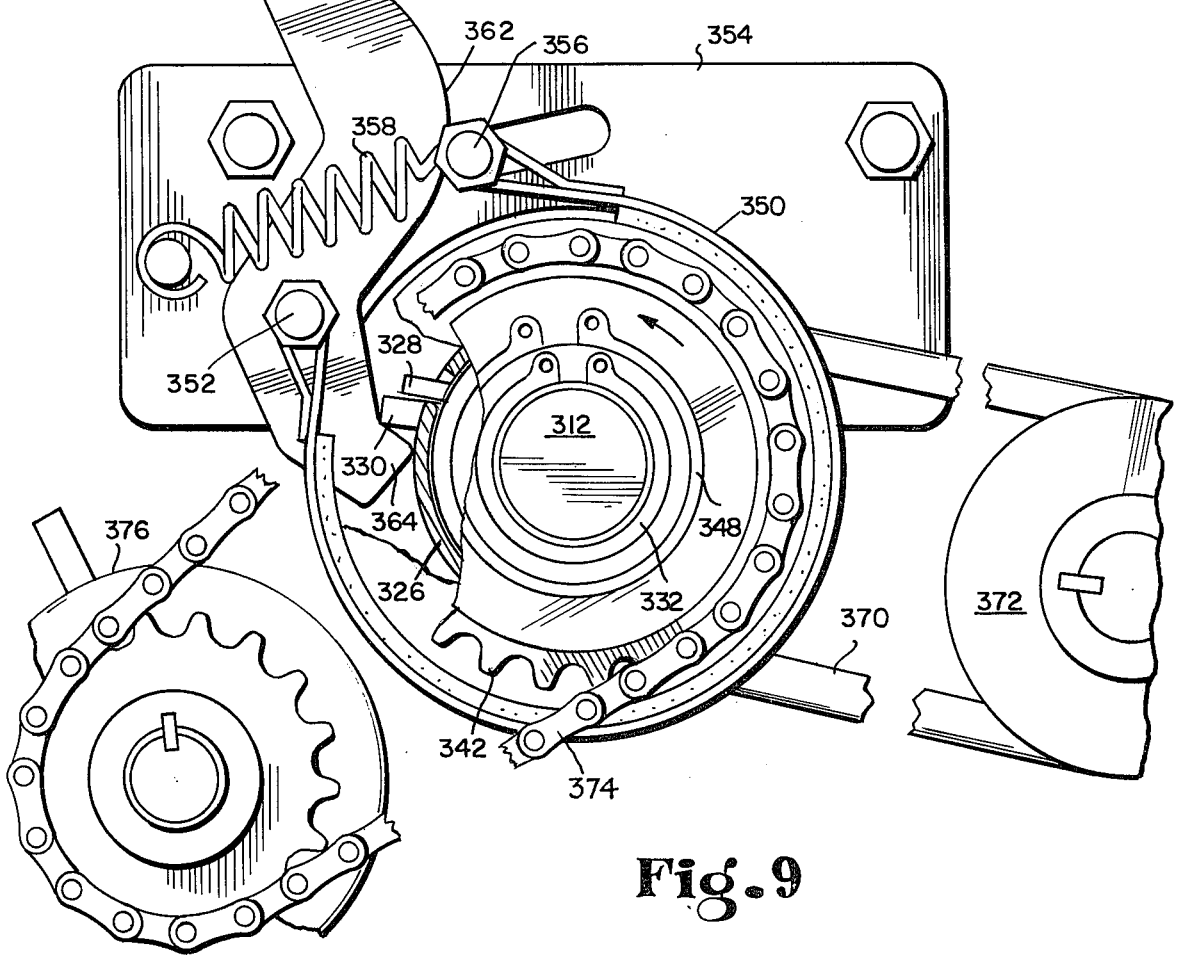
FIG. 9 is an end elevation of the clutch assembly shown in FIG. 8 with a diagrammatic showing of the application of that assembly to drive the wheels and blower blade of a snowblower.

The embodiment of FIGS. 8 and 9 comprises a clutch combination adapted to operate at relatively slow speeds such that a centrifugal clutch as in the preceding modifications would not be effective. The clutch mechanism comprises a hub 310 shown mounted on the output shaft 312 of a gear box 314 which is assumed to be driven through a suitably controlled drive train from an engine (not shown). The hub 310 has a pulley groove 316 at its inner end for belt connection to the wheel drive of an implement such as a snowblower. The hub 310 has a cylindrical clutch face 318 adjacent the pulley groove, and has a reduced outer portion 319 on which a first driven member of sleeve 320 is rotatably mounted and retained by a snap ring 332. The sleeve 320 has a cylindrical clutch face 322 in alignment with and adjacent to the clutch face 318 of the hub. A coil clutch spring 324 surrounds these clutch faces 318 and 322 and overlaps both so as to normally clutch the hub and the first driven member together. The spring is surrounded by a release sleeve or collar 326 provided with a notch which receives an out-turned tang 328 on the leading end of the spring 324, and which carries a wing 330 by which the rotation of the release collar can be stopped.

The first driven member or sleeve 320 carries both a brake drum 336 and a sprocket 342 which forms a secondary driven member and output element. The sleeve 320 has a shoulder intermediate its length, at the end of the clutch face 322, and the outer end of the sleeve is formed with one or more axial slots or keyways 334. The brake drum 336 is mounted by its web 338 on the sleeve 320 and against the shoulder 333, and has inward extending tongues 340 engaged in the keyways 334 to hold the drum against rotation on the sleeve 320. The sprocket 342 is rotatably mounted on the sleeve 320 and is engaged on opposite sides by friction washers 344 clamped between the web 338 of the brake drum 336 and a pressure plate 346 slidably mounted on the sleeve 320 and held from rotation thereon by inward extending tongues engaged in the slots 334 of the sleeve. The pressure plate 346 is biased toward the web 338 of the brake drum by one or more Bellville washers 347 held in place by a snap ring 348 engaged in a groove in the sleeve 320.

A brake band 350 is engaged about the drum 336. One end of the band is anchored to a pin 352 on a mounting plate 354, and the other end is connected to a draw pin 356 which is pulled toward brake-applying position by a spring 358. A cam lever 360 is pivoted on the anchor pin 352 and has a cam face 362 arranged to force the draw pin 356 to a brake releasing position when the lever 360 is pulled clockwise as shown in FIG. 9. The opposite end of the lever 360 carries a clutch release finger 364 which, in the normal, brake-engaged position of the lever 360, lies in the path of the wing 330 on the clutch release collar 326 so as to stop the rotation of that collar and arrest the rotation of the tang 328 at the leading end of the clutch spring.

As shown diagrammatically in FIG. 9, the pulley groove 312 of the clutch assembly is connected by a belt 370 to a wheel drive pulley 372, and the sprocket 342 is connected by a chain 374 to a snowblower element, here shown as a paddel wheel 376.

Operation of this modification of FIGS. 8 and 9 is as follows. With the parts as shown, the brake 350 is held in braking engagement with the drum 336 by the spring 358, and the clutch release finger 364 lies in the path of the wing 330 to hold the clutch release collar 326 in nonrotating position, and this arrests the rotation of the tang 328 and the leading end of the spring. Rotation of the hub 310 then tends to unwind the spring 324 relative to its stopped leading end, and the spring is hence declutched from the hub clutch face 318. The driven elements of the clutch assembly, i.e., the sleeve 320 and the sprocket 342, then remain stationary, while rotation of the hub drives the belt 370. It is assumed that the drive train to the wheels contains suitable controls, e.g., a speed-responsive clutch at the engine, or a manual release in the belt-operated mechanism, so that propulsion of the vehicle is under appropriate control. The actuating lever 360 for the brake and clutch is assumed to be connected to a dead-man lever which is normally in release position and is manually actuated and held when it is desired to drive the snowblowing element 376. When the dead-man lever is thus actuated, it pulls the actuating lever 360 clockwise, and this causes the cam face 362 to thrust the draw pin 356 to the right and release the brake band 350 from the drum 336. Movement of the lever 360 also carries the clutch control finger 364 clockwise out of the path of the wing 330 and allows the clutch release collar to rotate freely. The leading end of the spring 324 then rotates with the hub 310 and the spring clutches the hub to the first driven member of sleeve 320, which is now released from the brake band 350. Engagement of the spring clutch transmits drive torque through the friction washers 344 to the sprocket 342, which transmits drive through the chain to the snowblowing implement 376. The frictional clutch drive from the sleeve 320 to the driven sprocket 342 through the frictional washers 344 limits the torque which is transmitted to the final driven member or sprocket 342, and this limits the torque which is imposed on the clutch spring 324 as that spring engages. Since the assembly is being driven at relatively low speed from a speed-reducing gear box 314, this torque limiting effect is adequate to prevent excessive shock loads which would damage or destroy the spring 324. Moreover, the torque limiting effect continues and is relatively constant throughout the operation of the snowblowing implement 376, so that if that implement should strike an obstruction which imposes a shock load on the driving train, the frictional clutch between the sleeve 320 and the sprocket 342 will absorb the shock and permit sufficient slippage to prevent imposing an excessive shock load on the clutch spring 324 or other parts of the drive train.

This clutch combination permits a desirable dead-man control of the drive to the snowblowing implement 376, separate and independent from the propulsion drive of the snowblower vehicle from the pulley groove 316. The presence of the coil spring clutch as part of the dead-man control provides immediate interruption of the drive to the blowing implement when the dead-man control is released, so as to provide immediate stopping of that blowing element to prevent it from causing damage or injury. At the same time, the clutch combination provides a positive drive to that blower while also protecting the coil spring clutch and the rest of the drive train from excessive shock loads in the event the blower implement strikes an obstruction.

Figure 10:
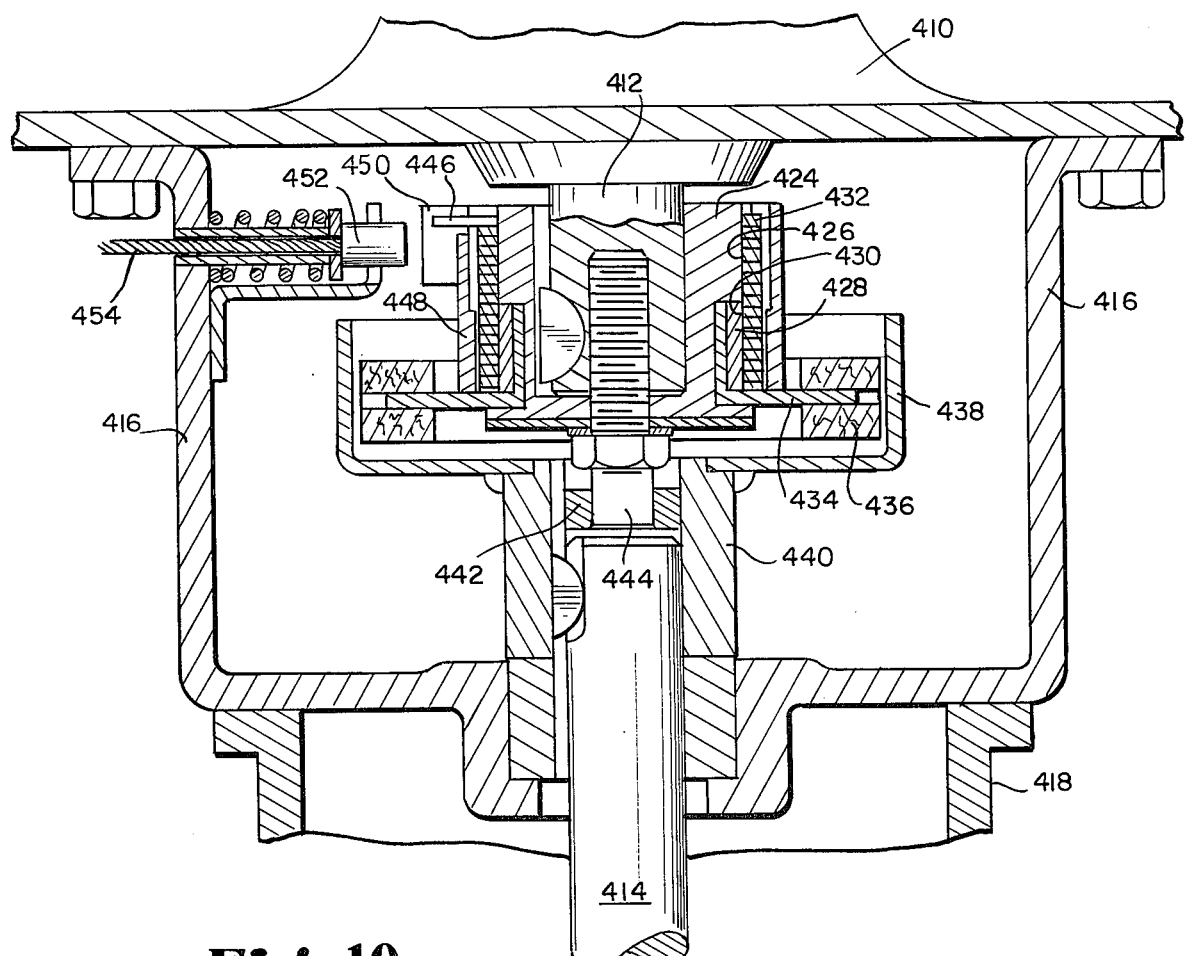
FIG. 10 is an axial section of a modified clutch assembly in accordance with the invention, applied to drive a tiller blade.
Figure 11:
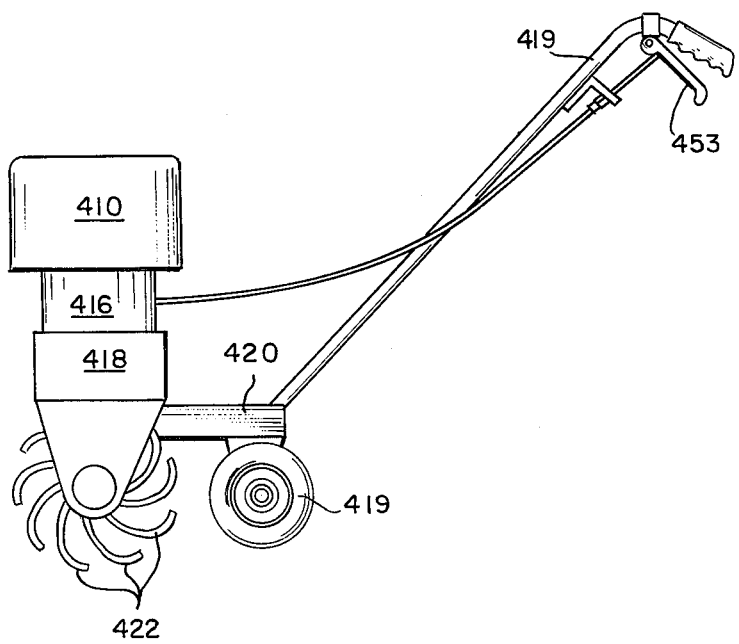
FIG. 11 is a diagrammatic view of a tiller of the type to which the clutch combination of FIG. 9 is applied.

The modification shown in FIG. 10 is adapted for use in a garden tiller such as a wheel-supported manually-propelled tiller as shown in FIG. 11. In this case, a clutch assembly in accordance with the present invention is interposed between the shaft 412 of an engine 410 and a driven shaft 414 leading to a gear reduction which drives the tiller implement at a reduced speed. As shown in FIG. 11, the engine 410 is mounted on a clutch housing 416 which in turn is mounted on a transmission housing 418. Such housing 418 has a transverse output shaft on which the cultivating implements 422 are mounted, and the whole assembly is mounted on a frame 420 having supporting wheels 419 and a handle 421. The clutch combination comprises a hub 424 mounted on the engine shaft 412 and having at its upper end a cylindrical clutch face 426. A first driven member 428 is rotatably mounted on a reduced diameter section of the hub 424 and has a cylindrical clutch face 430 aligned with and adjacent to the face 426 on the hub. A helical clutch spring 432 is mounted about and across the faces so as to normally clutch the hub 424 in forward driving direction to the first driven member or sleeve 428. Such sleeve carries at its lower end a shoe-carrier plate 434 on which are mounted a plurality of centrifugal clutch shoes 436, as of the type shown in FIGS. 1 and 2, which are spring-pressed to retracted position.

The second driven member of the clutch comprises a drum 438 positioned for driving engagement by the clutch shoes 436 and carried on a collar 440 mounted on the upper end of the driven shaft 414. The collar 440 is positioned in coaxial relation with the engine shaft 412 by means of a pilot bearing 442 contained in the collar 440 and engaged over a pilot stud 444 mounted in the end of the engine shaft 412.

For control of the spring clutch, the leading end of the spring 432 has an out-turned tang 446 engaged in a notch in a release collar 448 mounted about the spring. Such release collar carries a wing 450, and a stop plunger 452 is mounted in a bracket on the housing 416 and springpressed forward from its retracted position shown toward a position in which it lies in the path of the wing 450. A control cable 454 connected to the stop plunger 452 extends to a control lever 453 on the handle of the tiller implement. The stop 452 normally lies in the path of the wing 450 to stop rotation of the release collar 448 and thus to arrest rotation of the tang 446 and the forward end of the clutch spring 432. Rotation of the hub then tends to unwind the spring relative to its stopped leading end, and the spring is declutched from the hub face 426. When the operator desires to actuate the tiller elements 442, he pulls up on the control lever 453 on the handle and this pulls the stop 452 to its retracted position as shown in FIG. 10. This releases the collar 448 and the leading end of the spring 432, and such spring then clutches that hub to the first driven member or sleeve 428 so as to drive the shoe carrier 434. Such drive causes the shoes 436 to move outward under centrifugal force against the drum 438 to progressively transmit drive torque to that drum and to the drive shaft 414.

In all of the embodiments described, the use of the coil spring clutch provides an inexpensive and quickacting means to positively and rapidly interrupt the drive to a driven implement, which not only gives good control to the operator but serves also to protect the implement and the drive train and especially to provide a high degree of safety. The simple control mechanism is especially suitable for use with a dead-man control in which an actuating lever must be held inactuated position during operation of the driven blade or implement, and when released, quickly and positively interrupts the drive to the driven element. To make these advantages possible in applications where the spring clutch would not otherwise withstand the operating conditions, it is combined with a secondary torque-limiting clutch between the first driven member of the spring clutch and a second driven member, and such secondary torque limiting clutch may take different forms to provide different clutch characteristics and may provide speedresponsive clutching and control characteristics commonly used and desirable in certain drive applications. In some modifications, the clutch is controlled in common with or in response to the engagement of a brake which may have a drum in common with a centrifugal clutch forming the secondary clutch of the combination, and such brake enhances the safety characteristics of the combination. In each case, the secondary clutch limits the torque which may be imposed on the spring clutch during its engagement or from shock loads encountered during operation.

I claim:

1. A clutch assembly for the drive train of a power driven implement, comprising, a rotary driving member comprising a hub adapted to be mounted on a shaft and having a first cylindrical portion forming a clutch face thereon, said hub having a first reduced diameter portion adjacent said first cylindrical portion, a first driven member comprising a sleeve rotatably mounted on said first reduced portion and having a cylindrical clutch face in alignment with that on the driving member, a helical clutch spring in clutching engagement with said clutch faces and arranged with its leading end overlying the driving member, so as to form a forward-drive clutch between the members, a clutch release collar surrounding the clutch spring and engaged with the leading end thereof, said collar, when stopped, being operative to stop rotation of the leading end of the spring and thereby declutch the spring from the driving member, said hub also having a second reduced portion, there being a second driven member rotatably mounted on said second reduced portion coaxially with said first driven member and including a drum, centrifugal clutch shoes carried by said first driven member and arranged for engagement with said drum to transmit torque from the first driven member to the second driven member, said shoes being operative on initial engagement of said spring clutch to transmit not more than a limited torque from the first driven member to the second and thereafter to transmit increased torque in response to centrifugal force.

2. A clutch assembly as in claim 1 with the addition of a brake band mounted for engagement with the periphery of said drum, and control means for concurrently engaging said brake band and arresting rotation of said clutch release collar.

3. A clutch assembly as in claim 2 in which said clutch release collar carries a peripheral rim in alignment with said drum and said brake band is arranged to engage both the drum and the rim so as to stop rotation of the release collar in response to application of the brake band.

4. A clutch assembly as in claim 3 in which said rim carries one or more raised lands adapted to be engaged by the brake band prior to full engagement of the band with the drum.

5. A clutch assembly as in claim 1 in which the clutch shoes are normally biased into frictional engagement with said drum.

6. A clutch assembly as in claim 1 in which the clutch shoes are normally biased to disengaged relation with said drum.

* * * * *